United States Patent
Takagi et al.

(10) Patent No.: US 6,549,094 B2
(45) Date of Patent: Apr. 15, 2003

(54) HIGH FREQUENCY CERAMIC COMPACT, USE THEREOF, AND METHOD OF PRODUCING THE SAME

(75) Inventors: Hitoshi Takagi, Omihachiman (JP); Mizuki Kono, Yokaichi (JP); Tsutomu Tatekawa, Otsu (JP)

(73) Assignee: Murata Manufacturing Co. Ltd (JP)

( * ) Notice: Subject to any disclaimer, the term of this patent is extended or adjusted under 35 U.S.C. 154(b) by 0 days.

(21) Appl. No.: 09/874,880

(22) Filed: Jun. 5, 2001

(65) Prior Publication Data

US 2002/0057138 A1 May 16, 2002

(30) Foreign Application Priority Data

Sep. 8, 2000 (JP) ........................................ 2000-273643

(51) Int. Cl.[7] ............................ H01P 1/213; H01P 7/10; C04B 35/46

(52) U.S. Cl. ...................... 333/134; 333/202; 333/206; 333/219; 333/219.1; 501/134; 501/136

(58) Field of Search .................................. 333/134, 202, 333/206, 219, 204, 219.1; 501/134, 136

(56) References Cited

U.S. PATENT DOCUMENTS

| | | | |
|---|---|---|---|
| 4,721,692 A | | 1/1988 | Nishioka et al. |
| 5,175,132 A | | 12/1992 | Ketcham et al. |
| 5,340,783 A | * | 8/1994 | Anderson et al. ............ 501/134 |
| 6,242,376 B1 | | 6/2001 | Jacquin et al. |
| 6,245,702 B1 | * | 6/2001 | Tatekawa et al. ......... 333/219.1 |

FOREIGN PATENT DOCUMENTS

| | | | | |
|---|---|---|---|---|
| JP | 61168562 A | | 7/1986 | |
| JP | 62278704 A | | 12/1987 | |
| JP | 9-052760 | | 2/1997 | ......... C04B/35/111 |
| JP | 09052761 A | * | 2/1997 | |
| JP | 9-052762 | | 2/1997 | ......... C04B/35/111 |
| JP | 9-221355 | | 8/1997 | ........... C04B/35/10 |

OTHER PUBLICATIONS

I.B. Cutler, C. Bradshaw, C.J. Christensen, E.P. Hyatt, "Sintering of Alumina at Temperatures of 1400°C. and Below," Journal of the American Ceramic Society, Apr. 1957, pp. 134–139, vol. 40, No. 4.

M.C. Moreira & M. Segadaes, "Phase Equilibrium Relationships in the System $Al_2O_3$—$TiO_2$—MnO, Relevant to the Low–Temperature Sintering of Alumina," Journal of the European Ceramic Society, 1996, pp. 1089–1098, vol. 16, No. 10, Elsevier Science Limited, Great Britain.

\* cited by examiner

Primary Examiner—Seungsook Ham
(74) Attorney, Agent, or Firm—Dickstein, Shapiro, Morin & Oshinsky, LLP.

(57) ABSTRACT

A high frequency ceramic compact includes Al, Ti and Mn as metallic elements and contains substantially no $Al_2TiO_5$ phase as determined by X-ray diffraction analysis and is obtained by firing at about 1310° C. or lower. A preferred high frequency ceramic compact is represented by the following formula and has a Q-value at 10 GHz of 10,000 or more: $(100-x-y)AlO_{3/2}-xTiO_2-yMnO$, wherein x and y are % by mole and x and y satisfy the following conditions: $3.0 \leq x \leq 9.0$; and $0.1 \leq y \leq 1.0$. These high frequency ceramic compacts have a relative dielectric constant of 20 or less, a Q-value at 10 GHz of 10,000 or more, and can optionally control the temperature coefficient of resonant frequency around 0 ppm/° C.

18 Claims, 3 Drawing Sheets

HIGH FREQUENCY CERAMIC COMPACT, USE THEREOF, AND METHOD OF PRODUCING THE SAME

BACKGROUND OF THE INVENTION

1. Field of the Invention

The present invention relates to a high frequency ceramic compact for use in the microwave region, millimeter wave region, and other high frequency regions, and to a method of producing the same. Additionally, the present invention relates to a dielectric antenna, support for dielectric resonator, dielectric resonator, dielectric filer, dielectric duplexer and communication system, which are mounted on, for example, mobile phones, personal radios, satellite receivers, local area wireless networks and millimeter wave radars.

2. Description of the Related Art

Ceramic compacts are conventionally widely used in, for example, dielectric resonators and circuit boards for use in the microwave region, millimeter wave region and other high frequency regions.

Such high frequency ceramic compacts must have (1) a low dielectric loss, that is, a high Q-value, and (2) a thermally stable resonant frequency, that is, a temperature coefficient of resonant frequency ($\tau_f$) that can be optionally controlled in the vicinity of 0 ppm/° C.

In order to miniaturize the resulting device, a high relative dielectric constant ($\in_r$) of the ceramic is preferable since the wavelength of an electromagnetic wave in the dielectric is shortened to $1/(\in_r)^{1/2}$. However, demands have also been made to provide a material having a low relative dielectric constant, as the dielectric device becomes excessively small in size to deteriorate workability when the device is used at high frequencies.

This type of conventional high frequency ceramic compacts includes, for example, a Ba(Sn,Mg,Ta)O$_3$ based ceramic as described in Japanese Examined Patent Application Publication No. 3-34164, and a MgO—SiO$_2$—Al$_2$O$_3$ based ceramic as described in Japanese Examined Patent Application Publication No. 6-103603 and Japanese Unexamined Patent Application Publication No. 8-69715.

The Ba(Sn,Mg,Ta)O$_3$ based ceramic compact can control the temperature coefficient of resonant frequency ($\tau_f$) in the vicinity of 0 ppm/° C. and has a high Q-value at 10 GHz from 20,000 to 30,000. However, the ceramic compact has a high relative dielectric constant ($\in_r$) of 24 and the resulting device is excessively small in size to thereby deteriorate workability when it is used in a microwave region or millimeter wave region.

In contrast, the MgO—SiO$_2$—Al$_2$O$_3$ based ceramic compacts and alumina ceramics have a low relative dielectric constant ($\in_r$) from 7 to 10 and a high Q-value at 10 GHz from 6,000 to 29,000. These ceramics, however, have a high absolute value of the temperature coefficient of resonant frequency ($\tau_f$) from −30 to −50 ppm/° C. and are limited in application as dielectric materials for use in a microwave region or millimeter wave region.

A possible solution to control the temperature coefficient of resonant frequency ($\tau_f$) of the alumina ceramic compacts is a combination use with TiO$_2$ which has a positive temperature coefficient of resonant frequency ($\tau_f$). This type of raw material, however, must be sintered by firing at temperatures not lower than 1350° C., and firing at such high temperatures invites the formation of an Al$_2$TiO$_5$ crystal phase to thereby deteriorate the Q-value and other characteristics.

SUMMARY OF THE INVENTION

Accordingly, an object of the present invention is to solve the above problems and to provide a high frequency ceramic compact that is excellent in high frequency characteristics and temperature characteristics, has a relative dielectric constant ($\in_r$) of about 20 or less and a Q-value at 10 GHz of about 10,000 or more and can optionally control the temperature coefficient of resonant frequency ($\tau_f$) around 0 ppm/° C., and to provide a method of producing the high frequency ceramic.

Another object of the present invention is to provide, using the aforementioned ceramic compact, a dielectric antenna, support for dielectric resonator, dielectric resonator, dielectric filter or dielectric duplexer, each of which is excellent in electric characteristics, and a high-performance communication system of small size.

Specifically, the present invention provides, in an aspect, a high frequency ceramic compact which includes Al, Ti and Mn as metallic elements and contains substantially no Al$_2$TiO$_5$ crystal phase.

The high frequency ceramic compact is preferably obtained by firing at a temperature not exceeding about 1310° C.

In another aspect, the present invention provides a high frequency ceramic compact which has a Q-value at 10 GHz of 10000 or more and includes Al, Ti and Mn as metallic elements, is represented by the following formula: (100−x−y)AlO$_{3/2}$ −xTiO$_2$−yMnO, wherein x and y are % by mole and x and y satisfy the following conditions: $3.0 \leq x \leq 9.0$; and $0.1 \leq y \leq 1.0$.

Specifically, x and y in the compositional formula preferably further satisfy the following conditions: $3.0 \leq x \leq 7.0$ and $0.1 < y \leq 0.25$. Preferably, substantially no Al$_2$TiO$_5$ crystal phase is contained in the high frequency ceramic.

The compositional formula is the compositional formula of the high frequency ceramic compact after sintering. As raw materials for the high frequency ceramic compact, an alumina powder having a specific surface area of about 4 m$^2$/g or more and a titanium dioxide powder having a specific surface area of about 3 m$^2$/g or more are preferably used as the raw material of AlO$_{3/2}$ component and the raw material of TiO$_2$ component, respectively. An alumina powder having a specific surface area from about 4 m$^2$/g to 5 m$^2$/g is particularly preferably used as the raw material of AlO$_{3/2}$ component.

The present invention provides, in a further aspect, a method of producing a high frequency ceramic compact represented by the following formula: (100−x−y)AlO$_{3/2}$−xTiO$_2$−yMnO, wherein x and y are % by mole and x and y satisfy the following conditions: $3.0 \leq x \leq 9.0$; and $0.1 \leq y \leq 1.0$, which method includes the steps of:

mixing a raw material containing Al, a raw material containing Ti and a raw material containing Mn;

molding the resulting mixture to yield a green compact; and firing the green compact at a temperature not exceeding about 1310° C.

Preferably, an alumina powder having a specific surface area of about 4 m$^2$/g or more is used as the raw material containing Al, and a titanium dioxide powder having a specific surface area of about 3 m$^2$/g is used as the raw material containing Ti in the above method. The alumina powder preferably has a specific surface area from about 4 to 5 m$^2$/g. Additionally, the firing temperature is preferably about 1300° C. or lower.

DESCRIPTION OF THE PREFERRED EMBODIMENTS

Dielectric ceramics according to the present invention are specifically advantageously used in high frequency electronic parts. Embodiments of high frequency electronic parts using the invented dielectric ceramics will be illustrated in detail below, with reference to the attached drawings.

Dielectric Antenna

Figure 1:
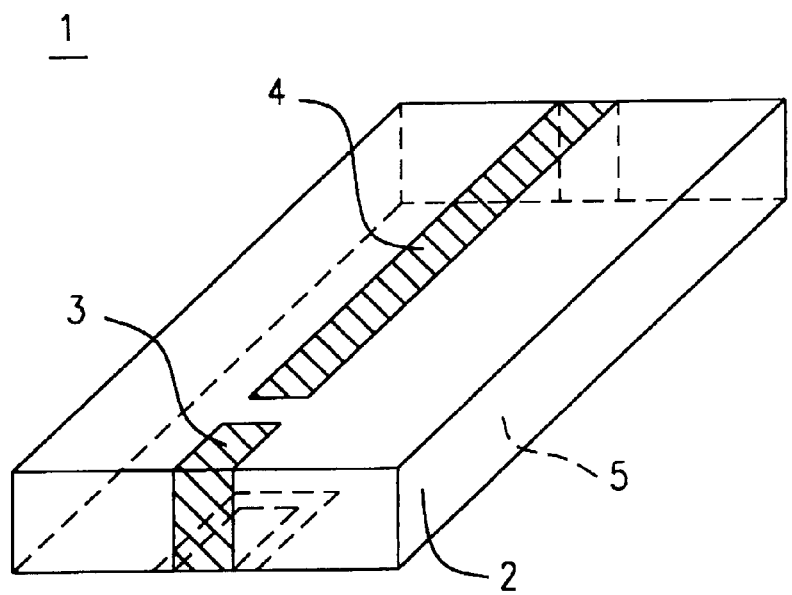
FIG. 1 is a perspective view of an embodiment of a dielectric antenna according to the present invention.

FIG. 1 is a schematic perspective view of an embodiment of a dielectric antenna according to the present invention. Dielectric antenna 1 is composed of cuboid antenna substrate 2. Input-output electrode 3 is formed on one side end of antenna substrate 2, and linear emitting electrode 4 is formed in center on the top face of antenna substrate 2 and extends to the other side end of antenna substrate 2. Emitting electrode 4 is arranged at a predetermined spacing from input-output electrode 3. Additionally, ground electrode 5 is formed to cover nearly the whole surface of the bottom face of antenna substrate 2, and is electrically connected to emitting electrode 4. In dielectric antenna 1 having the above configuration, antenna substrate 2 is composed of the invented high frequency ceramic compact.

A dielectric antenna having a stripline type emitting electrode is illustrated in FIG. 1, but the emitting electrode in the invented dielectric antenna is not limited to this type, and the invented high frequency ceramic can also be applied to dielectric antennas of the other types.

Support for Dielectric Resonator

Figure 2:
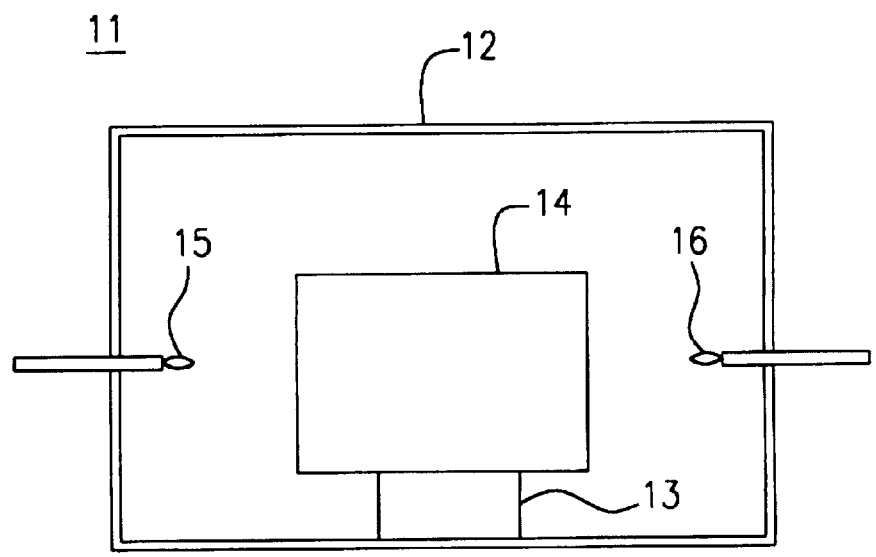
FIG. 2 is a schematic sectional view of a dielectric resonator system, showing an embodiment of a support for dielectric resonator according to the present invention.

FIG. 2 is a schematic sectional view of a TE 01δ mode dielectric resonator system, showing an embodiment of a support for dielectric resonator according to the present invention.

Dielectric resonator system 11 includes a metallic case 12, and a columnar dielectric resonator 14 supported by support 13 is placed in the space inside metallic case 12. Input terminal 15 and output terminal 16 are held and supported by metallic case 12.

In dielectric resonator system 11, support 13 supporting dielectric resonator 14 is composed of the invented high frequency ceramic compact.

Dielectric Resonator

Figure 3:
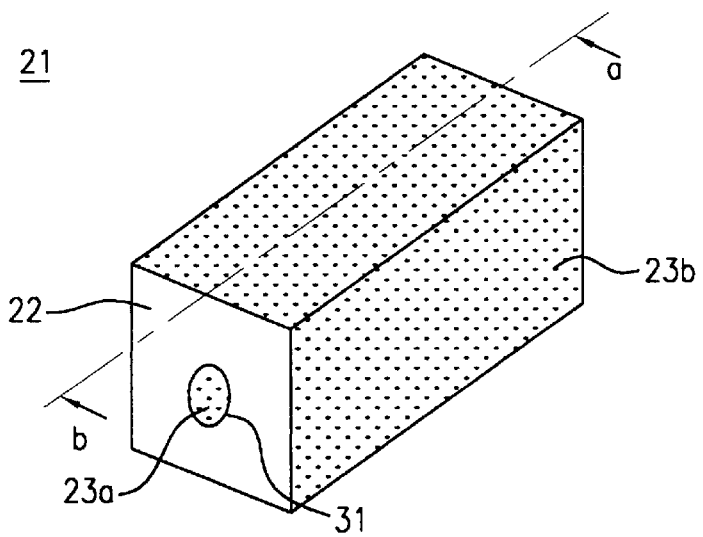
FIG. 3 is a perspective view of an embodiment of a dielectric resonator according to the present invention.
Figure 4:
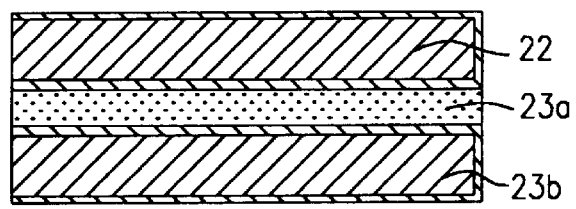
FIG. 4 is a sectional view of the dielectric resonator shown in FIG. 3 taken along the line a–b.

FIG. 3 is a schematic perspective view of an embodiment of a dielectric resonator according to the present invention, and FIG. 4 is a sectional view of dielectric resonator 21 shown in FIG. 3 taken along the line a–b.

Dielectric resonator 21 is composed of prismatic dielectric ceramic 22 having through hole 31. Inner conductor 23a is formed inside through hole 31 and outer conductor 23b is formed around the dielectric resonator. Dielectric resonator 21 acts as a dielectric resonator by electromagnetic coupling of dielectric ceramic body 22 with an input-output terminal, i.e., an external coupling means.

Dielectric ceramic body 22 constituting dielectric resonator 21 is composed of the invented high frequency ceramic compact.

A prismatic dielectric resonator that propagates a TEM mode is illustrated in FIG. 3, but the present invention is not limited to dielectric resonators propagating this mode. Naturally, the invented high frequency ceramic can also be applied to dielectric resonators propagating the other resonant modes such as a transverse electromagnetic mode (TEM mode), transverse magnetic mode (TM mode), and transverse electric mode (TE mode).

Dielectric Filter

Figure 5:
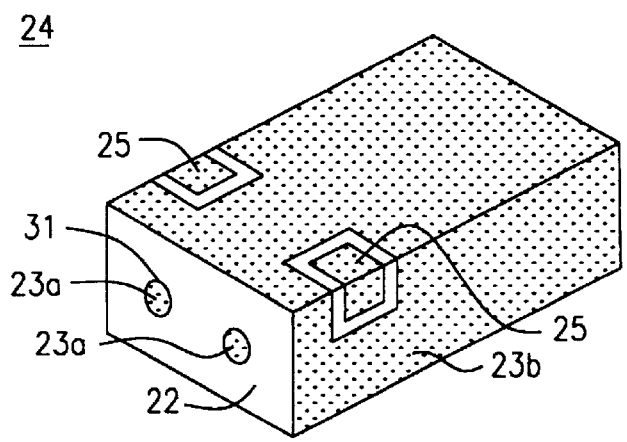
FIG. 5 is a perspective view of an embodiment of a dielectric filter according to the present invention.

FIG. 5 is a schematic perspective view of an embodiment of a dielectric filter according to the present invention.

Dielectric filter 24 includes a dielectric resonator and external coupling means 25 as an input-output terminal formed on the dielectric resonator. The dielectric resonator includes dielectric ceramic body 22 having through hole 31, and inner conductor 23a formed inside through hole 31, and outer conductor 23b formed on the surface of dielectric ceramic body 22.

A block dielectric filter is illustrated in FIG. 5, but the invented dielectric filter can also be a discrete dielectric filter.

Dielectric Duplexer

Figure 6:
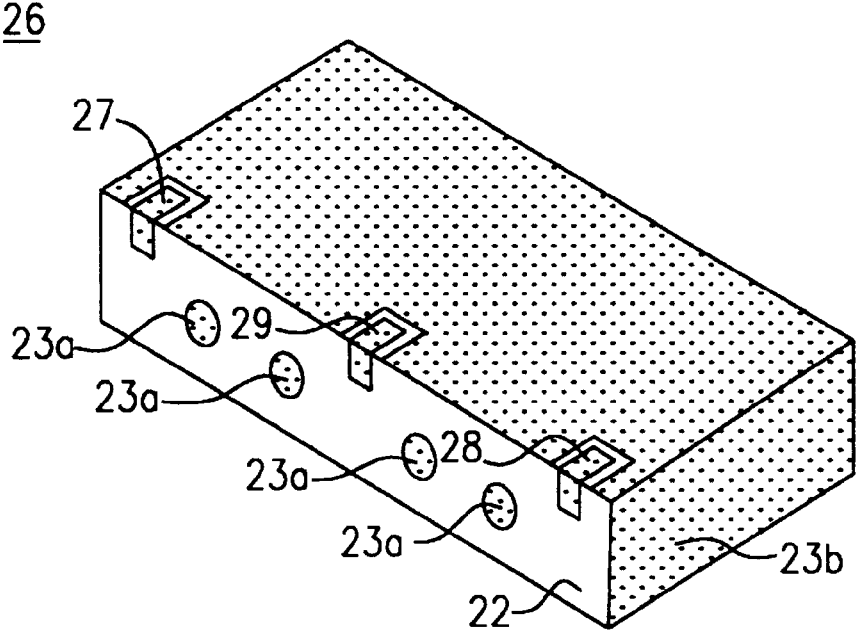
FIG. 6 is a perspective view of an embodiment of a dielectric duplexer according to the present invention.

FIG. 6 is a schematic perspective view of an embodiment of a dielectric duplexer according to the present invention.

Dielectric duplexer 26 includes two dielectric filters, input connecting means 27 which is connected to one of the two dielectric filters, output connecting means 28 which is connected to the other dielectric filter, and antenna connecting means 29 which is connected to the two dielectric filters in common. Each of the two dielectric filters includes a dielectric resonator, and the dielectric resonator includes dielectric ceramic body 22 having through hole 31, inner conductor 23a formed inside through hole 31, and outer conductor 23b formed on the surface of dielectric ceramic 22.

A block dielectric duplexer is illustrated in FIG. 6, but the invented dielectric duplexer can also be a discrete dielectric duplexer.

Communication System

Figure 7:
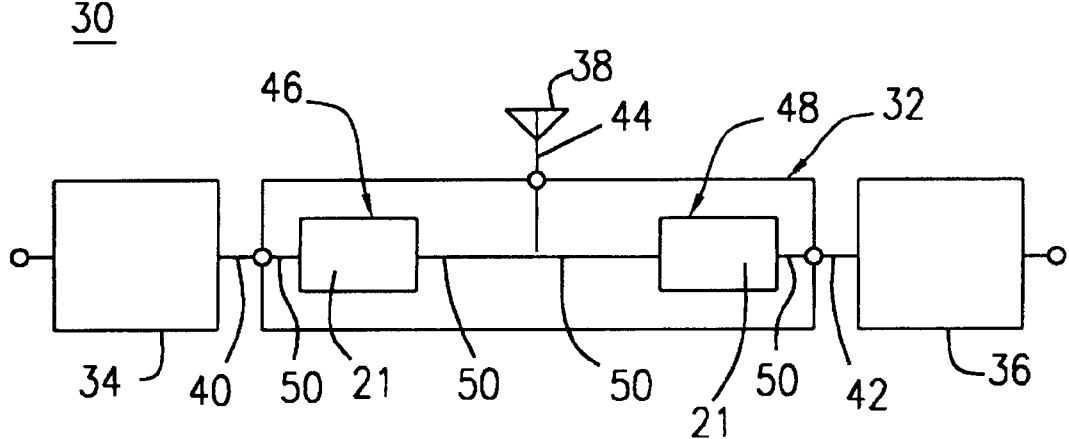
FIG. 7 is a block diagram of an embodiment of a communication system according to the present invention.

FIG. 7 is a block diagram of an embodiment of a communication system according to the present invention.

Communication system 30 includes dielectric duplexer 32, transmitting circuit 34, receiving circuit 36, and antenna 38. Transmitting circuit 34 is connected to input connecting means 40 of dielectric duplexer 32, and receiving circuit 36 is connected to output connecting means 42 of dielectric duplexer 32. Antenna 38 is connected to antenna connecting means 44 of dielectric duplexer 32. Dielectric duplexer 32 includes two dielectric filters 46 and 48. Each of dielectric filters 46 and 48 is composed of the invented dielectric resonator and an external coupling means connected to the dielectric resonator. In this embodiment, for example, the dielectric filters are formed by connecting each of external coupling means 50 to input and output terminals of dielectric resonator 21, respectively. One dielectric filter 46 is connected between input connecting means 40 and the other dielectric filter 48, and the other dielectric filter 48 is connected between dielectric filter 46 and output connecting means 42.

The applications of the invented high frequency ceramics are not limited to the aforementioned devices such as dielectric antennas and dielectric resonators, and widely include high frequency devices such as circuit boards for use in a microwave region or millimeter wave region.

EXAMPLES

The present invention will be illustrated in further detail with reference to examples below, which are not intended to limit the scope of the invention.

Example 1

Initially, a high purity alumina ($Al_2O_3$) powder having a purity of 99.9% or more and a specific surface area of 4 $m^2/g$, a titanium dioxide ($TiO_2$) powder having a purity of 99.8% or more and a specific surface area of 3 $m^2/g$, and a manganese carbonate ($MnCO_3$) powder were prepared as starting materials.

These materials were then mixed together to yield ceramics having the compositional ratios after firing indicated in Table 1.

The mixed powder was wet-milled with an appropriate amount of a binder in a ball mill for 16 hours, was dried, was press-molded at a pressure from 1,000 to 2,000 $kg/cm^2$ into a disc, and the disc was fired at the temperature indicated in Table 1 in air to thereby yield a ceramic disc (sintered ceramic compact). The obtained ceramic was ground to a diameter of 10 mm and a thickness of 5 mm to thereby yield a test sample.

In this connection, the molding operation can also be conducted by sheet molding, cold-isostatic pressing (CIP), wet-molding, pressure slip casting and any other techniques that can yield a desired shape, as well as the press molding technique.

Each of the above-prepared samples was subjected to measurement of relative dielectric constant ($\epsilon_r$) and Q-value at measuring wavelengths of 10 to 14 GHz by a method using a both-ends short-circuited dielectric resonator. The measured Q-value was converted to a Q-value at 10 GHz pursuantly to the law that Q multiplied by f is constant. Separately, the temperature coefficient of resonant frequency ($\tau f$, 25° C. to 55° C.) was calculated from the temperature change of TEO 1δ mode resonant frequency. The crystal phase of each of Samples 3, 9, 16, 31 and 37 was determined by X-ray diffraction analysis with Cu—Kα ray at a wavelength λ of 1.5418 angstroms.

These results are shown in Table 1 below.

TABLE 1

| | Composition: $(100-x-y)AlO_{3/2}-yTiO_2-zMnO$ | | | | | | | |
|---|---|---|---|---|---|---|---|---|
| Sample Number | $AlO_{3/2}$ (100-x-y) | $TiO_2$ x | MnO y | Firing Temp. (° C.) | Relative Dielectric Constant $\epsilon_r$ | Q-value (10 GHz) | Temperature Coefficient of Resonant Frequency $\tau_f$(ppm/° C.) | Crystal Phase |
| 1 | 100.00 | 0.00 | 0 | 1550 | 10.0 | 11,920 | −53.0 | — |
| 2 | 98.00 | 2.00 | 0 | 1310 | 8.6 | 1,000 | — | — |
| 3 | 95.5 | 4.5 | 0 | 1400 | 11.4 | 9500 | −16.9 | $Al_2O_3$, $TiO_2$, $Al_2TiO_5$ |
| 4 | 95.50 | 4.50 | 0 | 1310 | 9.6 | 1,500 | — | — |
| 5 | 90.00 | 10.00 | 0 | 1310 | 13.2 | 1,140 | — | — |
| 6 | 97.90 | 2.00 | 0.10 | 1310 | 11.3 | 13,500 | −31.2 | — |
| 7 | 96.90 | 3.00 | 0.10 | 1310 | 12.0 | 21,300 | −20.0 | — |
| 8 | 95.90 | 4.00 | 0.10 | 1310 | 12.3 | 22,500 | −11.2 | — |
| 9 | 95.40 | 4.50 | 0.10 | 1310 | 12.5 | 24,400 | −6.5 | $Al_2O_3$, $TiO_2$, |
| 10 | 92.90 | 7.00 | 0.10 | 1310 | 13.5 | 19,500 | 17.8 | — |
| 11 | 90.90 | 9.00 | 0.10 | 1310 | 14.4 | 14,000 | 35.1 | — |
| 12 | 89.90 | 10.00 | 0.10 | 1310 | 15.6 | 12,500 | 52.5 | — |
| 13 | 97.75 | 2.00 | 0.25 | 1290 | 10.9 | 14,300 | −32.1 | — |
| 14 | 96.75 | 3.00 | 0.25 | 1290 | 11.5 | 21,600 | −16.8 | — |
| 15 | 95.75 | 4.00 | 0.25 | 1290 | 12.1 | 20,500 | −6.5 | — |
| 16 | 95.25 | 4.50 | 0.25 | 1290 | 12.4 | 18,900 | −4.8 | $Al_2O_3$, $TiO_2$, |
| 17 | 92.75 | 7.00 | 0.25 | 1290 | 13.9 | 17,200 | 24.4 | — |
| 18 | 90.75 | 9.00 | 0.25 | 1290 | 15.1 | 13,600 | 38.0 | — |
| 19 | 89.75 | 10.00 | 0.25 | 1290 | 15.7 | 12,100 | 55.3 | — |
| 20 | 97.60 | 2.00 | 0.40 | 1270 | 10.8 | 14,500 | −33.7 | — |
| 21 | 96.60 | 3.00 | 0.40 | 1270 | 11.4 | 14,800 | −23.2 | — |
| 22 | 95.60 | 4.00 | 0.40 | 1270 | 12.1 | 14,300 | −12.7 | — |
| 23 | 95.10 | 4.50 | 0.40 | 1270 | 12.4 | 14,100 | −7.5 | — |
| 24 | 92.60 | 7.00 | 0.40 | 1270 | 14.1 | 12,800 | 18.8 | — |
| 25 | 90.60 | 9.00 | 0.40 | 1270 | 15.4 | 11,900 | 39.8 | — |
| 26 | 89.60 | 10.00 | 0.40 | 1270 | 15.9 | 10,300 | 50.3 | — |
| 27 | 97.50 | 2.00 | 0.50 | 1250 | 10.7 | 9,900 | −39.0 | — |
| 28 | 96.50 | 3.00 | 0.50 | 1250 | 11.3 | 14,500 | −27.8 | — |
| 29 | 95.50 | 4.00 | 0.50 | 1250 | 11.9 | 14,100 | −16.6 | — |

TABLE 1-continued

Composition: $(100-x-y)AlO_{3/2}$-$yTiO_2$-$zMnO$

| Sample Number | AlO$_{3/2}$ (100-x-y) | TiO$_2$ x | MnO y | Firing Temp. (° C.) | Relative Dielectric Constant $\epsilon_r$ | Q-value (10 GHz) | Temperature Coefficient of Resonant Frequency $\tau_f$(ppm/° C.) | Crystal Phase |
|---|---|---|---|---|---|---|---|---|
| 30 | 95.00 | 4.50 | 0.50 | 1250 | 12.2 | 13,900 | −11.0 | — |
| 31 | 92.50 | 7.00 | 0.50 | 1250 | 13.7 | 12,900 | 17.0 | Al$_2$O$_3$, TiO$_2$ |
| 32 | 90.50 | 9.00 | 0.50 | 1250 | 14.9 | 11,100 | 39.4 | — |
| 33 | 89.50 | 10.00 | 0.50 | 1250 | 15.5 | 8,700 | 50.6 | — |
| 34 | 97.00 | 2.00 | 1.00 | 1200 | 10.5 | 11,900 | −47.9 | — |
| 35 | 96.00 | 3.00 | 1.00 | 1200 | 11.1 | 11,000 | −27.2 | — |
| 36 | 95.00 | 4.00 | 1.00 | 1200 | 10.8 | 10,800 | −26.5 | — |
| 37 | 94.50 | 4.50 | 1.00 | 1200 | 11.8 | 11,500 | −21.1 | Al$_2$O$_3$, TiO$_2$, |
| 38 | 92.00 | 7.00 | 1.00 | 1200 | 12.1 | 10,900 | 5.7 | — |
| 39 | 90.00 | 9.00 | 1.00 | 1200 | 13.6 | 10,100 | 37.9 | — |
| 40 | 89.00 | 10.00 | 1.00 | 1200 | 15.6 | 7,920 | 53.3 | — |
| 41 | 95.70 | 2.00 | 2.30 | 1200 | 10.8 | 8,400 | −40.2 | — |
| 42 | 93.20 | 4.50 | 2.30 | 1200 | 12.3 | 7,500 | −12.3 | — |
| 43 | 87.70 | 10.00 | 2.30 | 1200 | 15.6 | 6,920 | 54.2 | — |

Table 1 shows that the high frequency ceramics of Samples 7 to 11, 14 to 18, 21 to 25, 28 to 32 and 35 to 39 exhibit a high Q-value while maintaining a low relative dielectric constant in the microwave region.

The values of x and y in a high frequency ceramic represented by the compositional formula: $(100-x-y)AlO_{3/2}$–$xTiO_2$–$yMnO$, wherein x and y are % by mole, are examined herein with reference to Table 1.

As indicated in Table 1, x in the compositional formula is preferably in a range from about 3.0 to 9.0. If x is less than about 3.0 (Samples 6, 13, 20, 27, 34 and 41) or more than about 9.0 (Samples 12, 19, 26 and 33), the temperature coefficient of resonant frequency ($\tau_f$) becomes lower than −30 ppm/° C. or becomes higher than +50 ppm/° C., and a stable temperature coefficient of resonant frequency cannot be significantly obtained.

Table 1 also shows that y in the compositional formula is preferably in a range from about 0.1 to 1.0. If y is less than about 0.1 (Sample 4), the resulting composition cannot be sufficiently sintered at temperatures not exceeding about 1310° C. and the resulting sintered compact tends to have a low Q-value. If y is more than about 1.0 (Sample 42), the resulting composition can be sintered at temperatures not exceeding about 1310° C., but the resulting sintered compact tends to have a low Q-value.

Additionally, when both x and y in the compositional formula satisfy the following conditions: $3.0 \leq x \leq 7.0$; and $0.1 \leq y \leq 0.25$ as in the ceramics of Samples 7 to 10 and 14 to 17, the resulting sintered compact can exhibit satisfactory temperature characteristics of a temperature coefficient of resonant frequency ($\tau_f$) in a range of 0±30 ppm/° C. and can have excellent high frequency characteristics of a Q-value at 10 GHz of 15,000 or more.

As apparent from the comparison between the ceramic of Sample 3 and the ceramics of Samples 9, 16, 31 and 37, the high frequency ceramics of the present invention contain substantially no observed Al$_2$TiO$_5$ crystal phase and can have a high Q-value.

Example 2

Initially, a high purity alumina (Al$_2$O$_3$) powder, titanium dioxide (TiO$_2$) powder and manganese carbonate (MnCO$_3$) powder were prepared as starting materials. As the Al$_2$O$_3$ powder, those each having a purity of 99.9% or more and a specific surface area of 3 m$^2$/g, 4 m$^2$/g or 13 m$^2$/g were used. As the TiO$_2$ powder, those each having a purity of 99.8% or more and a specific surface area of 1 m$^2$/g, 3 m$^2$/g, 7 m$^2$/g and 30 m$^2$/g were used.

Next, these materials were mixed together to yield ceramics each having the compositional ratio after firing indicated in Table 2.

A series of samples was prepared in the same manner as in Example 1, except that the firing temperatures were set at the temperatures indicated in Table 2. The relative dielectric constant ($\epsilon_r$), Q-value and temperature coefficient of resonant frequency ($\tau_f$) of the prepared samples were determined in the same manner as in Example 1. The results are shown in Table 2 below.

TABLE 2

Composition: $(100-x-y)AlO_{3/2}$-$yTiO_2$-$zMnO$

| Sample Number | AlO$_{3/2}$ (100-x-y) | TiO$_2$ x | MnO y | Specific Surface Area of TiO$_2$ (m$^2$/g) | Specific Surface Area of TiO$_2$ (m$^2$/g) | Firing Temp. (° C.) | Relative Dielectric Constant $\epsilon_r$ | Q-value (10 GHz) | Temperature Coefficient of Resonant Frequency $\tau_f$(ppm/° C.) |
|---|---|---|---|---|---|---|---|---|---|
| 44 | 94.50 | 5.25 | 0.25 | 3 | 1 | 1310 | 12.5 | 10,500 | 6.7 |
| 45 | 94.50 | 5.25 | 0.25 | 4 | 1 | 1310 | 12.7 | 13,100 | 5.2 |
| 46 | 94.50 | 5.25 | 0.25 | 4 | 3 | 1290 | 12.8 | 17,600 | 4.8 |
| 47 | 94.50 | 5.25 | 0.25 | 4 | 7 | 1290 | 12.8 | 17,700 | 4.4 |
| 48 | 94.50 | 5.25 | 0.25 | 4 | 30 | 1270 | 12.4 | 21,000 | 1.5 |
| 49 | 94.50 | 5.25 | 0.25 | 13 | 3 | 1270 | 12.7 | 18,500 | 2.7 |

TABLE 2-continued

Composition: (100-x-y)AlO$_{3/2}$-yTiO$_2$-zMnO

| Sample Number | AlO$_{3/2}$ (100-x-y) | TiO$_2$ x | MnO y | Specific Surface Area of TiO$_2$ (m$^2$/g) | Specific Surface Area of TiO$_2$ (m$^2$/g) | Firing Temp. (° C.) | Relative Dielectric Constant $\epsilon_r$ | Q-value (10 GHz) | Temperature Coefficient of Resonant Frequency $\tau_f$ (ppm/° C.) |
|---|---|---|---|---|---|---|---|---|---|
| 50 | 94.50 | 5.25 | 0.25 | 13 | 7 | 1270 | 12.7 | 18,900 | 1.5 |
| 51 | 94.50 | 5.25 | 0.25 | 13 | 30 | 1250 | 12.6 | 15,600 | 0.2 |
| 52 | 94.65 | 5.25 | 0.10 | 13 | 30 | 1270 | 12.9 | 22,000 | 3.5 |
| 53 | 94.25 | 5.25 | 0.50 | 13 | 30 | 1210 | 12.6 | 15,200 | −1.0 |
| 54 | 96.75 | 3.00 | 0.25 | 13 | 30 | 1250 | 11.3 | 18,300 | −15.5 |
| 55 | 92.75 | 7.00 | 0.25 | 13 | 30 | 1250 | 13.6 | 15,100 | 21.2 |

Table 2 shows that smaller grain sizes of the alumina and titanium dioxide powders are preferred in order to improve sinterability at low temperatures. Specifically, the compositions can be fired at temperatures lower than 1300° C. by using an alumina powder having a specific surface area of about 4 m$^2$/g or more and a titanium dioxide powder having a specific surface area of about 3 m$^2$/g or more.

For example, as apparent from the comparison between the ceramic of Sample 51 and the ceramics of Samples 44 and 45, the use of an alumina powder having a specific surface area of 13 m$^2$/g and a titanium dioxide powder having a specific surface area of 30 m$^2$/g can decrease the firing temperature about 60° C. to 80° C. without deterioration of the characteristics, as compared with the use of an alumina powder having a specific surface area less than 4 m$^2$/g and a titanium dioxide powder having a specific surface area less than 3 m$^2$/g.

However, excessively small grain sizes of material powders used, particularly of an alumina powder used, increase the cost of the powders or increase the bulkiness of powders to thereby deteriorate productivity. Such excessively small grain sizes are therefore not always commercially effective. Accordingly, a comprehensive consideration of performance, cost and productivity shows that the alumina powder should preferably have a specific surface area from about 4 m$^2$/g to 5 m$^2$/g and the titanium dioxide powder should preferably have a specific surface area of about 3 m$^2$/g or more.

An Al oxide, Ti oxide and Mn carbonate were used as raw materials in the above examples. However, the starting materials for use in the present invention are not specifically limited to these, and compounds, such as carbonates, nitrate, and hydroxides, which form oxides by firing can be appropriately used.

The invented high frequency ceramics may further comprise trace amounts of additives within ranges not deteriorating the aforementioned characteristics. For example, incorporation of SiO$_2$, B$_2$O$_3$, V$_2$O$_5$, or WO$_3$ in an amount of about 1.0% by weight or less can decrease the firing temperature about 10° C. to 20° C., while suppressing deterioration of characteristics.

Additionally, the invented high frequency ceramics may further comprise obligatory impurities such as Na, K, Fe, Cu, Ga, Cl, Ca and Zr in an amount of about 0.1% by weight in terms of oxide. The amount of Zr element should be preferably controlled to 1.0% by weight or less in terms of oxygen based on the total weight of the ceramic.

Advantages

As described above, the invented high frequency ceramic comprising Al, Ti and Mn as metallic elements contains substantially no Al$_2$TiO$_5$ phase as determined by X-ray diffraction analysis, and therefore has a low relative dielectric constant ($\epsilon_r$) of 20 or less and a high Q-value at 10 GHz of 10,000 or more, and can optionally control the temperature coefficient of resonant frequency ($\tau_f$) around 0 ppm/° C. to thereby yield satisfactory high frequency characteristics and temperature characteristics.

Additionally, by further specifying the amounts of the Ti component and Mn component in the high frequency ceramic represented by the compositional formula, satisfactory characteristics of the temperature coefficient of resonant frequency in a range of 0±30 ppm/° C. and a Q-value at 10 GHz of 15,000 or more can be obtained.

The use of an alumina powder having a specific surface area of about 4 m$^2$/g or more and a titanium dioxide powder having a specific surface area of about 3 m$^2$/g or more respectively as the Al material and Ti material of the invented high frequency ceramic can inhibit material costs from increasing and can improve sinterability at low temperatures without deterioration of productivity.

Accordingly, the use of the dielectric ceramic having the above composition can yield a dielectric antenna, support for, for example, dielectric resonator, dielectric resonator, dielectric filter, and dielectric duplexer, each of which has satisfactory electric characteristics, and can yield a high performance communication system of small size.

Other embodiments and variations will be obvious to those skilled in the art, and this invention is not to be limited to the specific matters stated above.

What is claimed is:

1. A high frequency ceramic compact having a Q-value at 10 GHz of at least about 10,000 and comprising Al, Ti and Mn as metallic elements, said compact being represented by the formula (100−x−y)AlO$_{3/2}$−xTiO$_2$−yMnO wherein x and y are % by mole, 3.0≦x≦9.0, and 0.1≦y≦1.0.

2. A high frequency ceramic compact according to claim 1, wherein 3.0≦x≦7.0 and 0.1 ≦y≦0.25.

3. A high frequency ceramic compact according to claim 2, containing substantially no Al$_2$TiO$_5$ crystal phase.

4. A high frequency ceramic compact according to claim 1, containing substantially no Al$_2$TiO$_5$ crystal phase.

5. A method of producing a high frequency ceramic compact represented by the formula:

(100−x−y)AlO$_{3/2}$−xTiO$_2$−yMnO wherein x and y are % by mole, $3.0 \leq x \leq 9.0$, and $0.1 \leq y \leq 1.0$, said method comprising the steps of:
provide a mixture of a raw material containing Al, a raw material containing Ti and a raw material containing Mn;

molding the resulting mixture to form a green compact; and firing the green compact at a temperature not exceeding about 1310° C.

6. A method according to claim 5, where said raw material containing Al is an alumina powder having a specific surface area of at least about 4 m²/g, and said raw material containing Ti is a titanium dioxide powder having a specific surface area of at least about 3 m²/g.

7. A method according to claim 6, wherein said raw material containing Al is an alumina powder having a specific surface area of about 4 to 5 m²/g.

8. In an electronic device having a portion comprising a dielectric ceramic body, the improvement which comprises the dielectric ceramic body comprising a high frequency dielectric ceramic compact having a Q-value at 10 GHz of at least about 10,000 and comprising Al, Ti, and Mn as metallic elements, said compact being represented by the formula $(100-x-y)AlO_{3/2}$ 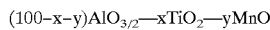 $xTiO_2$ 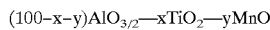 $yMnO$ wherein x and y are % by mole, $3.0 \leq x \leq 9.0$, and $0.1 \leq y \leq 1.0$.

9. An electronic device according to claim 8 which comprises a dielectric antenna comprising said dielectric ceramic body and an emitting electrode on a surface of said dielectric ceramic.

10. An electronic device according to claim 8 which comprises a dielectric support supporting a dielectric ceramic in a dielectric resonator activatable by electromagnetic coupling of the dielectric ceramic with an input-output terminal, wherein said support comprises said high frequency ceramic compact.

11. An electronic device according to claim 8 which comprises a dielectric resonator which comprises said dielectric ceramic body electromagnetic coupled to an input-output terminal.

12. An electronic device which is a dielectric filter comprising said dielectric resonator according to claim 11 and an external coupler connected thereto.

13. An electronic device which is a dielectric duplexer comprising first and second dielectric filter, a second input-output connector connected to said second dielectric filter, and an antenna connector connected to said both of the first and second dielectric filters, wherein at least one of the said first and second dielectric filters is said dielectric filter according to claim 12.

14. An electronic device which comprises a communication system comprising:

the dielectric duplexer of claim 13;

a transmitting circuit connected to said first input-output connector of said dielectric duplexer;

a receiving circuit connected to said second input-output connector of said transmitting circuit; and an antenna connected to the antenna connector of said dielectric duplexer.

15. In an electronic device having a portion which comprises a dielectric ceramic body, the improvement which comprises the dielectric ceramic body comprising a high frequency dielectric ceramic compact having a Q-value at 10 GHz of at least about 10,000 and comprising Al, Ti and Mn as metallic elements, said compact being represented by the formula $(100-x-y)AlO_{3/2}-xTiO_2-yMnO$ wherein x and y are % by mole, $3.0 \leq x \leq 7.0$, and $0.1 \leq y \leq 0.25$.

16. An electronic device according to claim 15 which comprises a dielectric antenna comprising said dielectric ceramic body and an emitting electrode on a surface of said dielectric ceramic.

17. An electronic device according to claim 15 which comprises a dielectric support supporting a dielectric ceramic in a dielectric resonator activatable by electromagnetic coupling of the dielectric ceramic with an input-output terminal, wherein said support comprises said high frequency ceramic compact.

18. An electronic device according to claim 15 which comprises a dielectric resonator which comprises a dielectric resonator which comprises said dielectric ceramic body electromagnetic coupled to an input-output terminal.

* * * * *